US010968291B2

(12) United States Patent
Meier et al.

(10) Patent No.: US 10,968,291 B2
(45) Date of Patent: *Apr. 6, 2021

(54) OLEFIN POLYMERIZATION PROCESS IN A GAS-PHASE REACTOR COMPRISING A RISER UNIT AND A DOWNCOMER

(71) Applicant: Basell Polyolefine GmbH, Wesseling (DE)

(72) Inventors: Gerhardus Meier, Frankfurt am Main (DE); Ulf Schueller, Weiterstadt (DE); Gabriele Mei, Ferrara (IT); Massimo Covezzi, Ferrara (IT); Pietro Baita, Ferrara (IT); Lorella Marturano, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 117 days.

This patent is subject to a terminal disclaimer.

(21) Appl. No.: 16/348,636

(22) PCT Filed: Nov. 9, 2017

(86) PCT No.: PCT/EP2017/078729
§ 371 (c)(1),
(2) Date: May 9, 2019

(87) PCT Pub. No.: WO2018/087214
PCT Pub. Date: May 17, 2018

(65) Prior Publication Data
US 2019/0322775 A1 Oct. 24, 2019

(30) Foreign Application Priority Data
Nov. 10, 2016 (EP) .................................. 16198262
Jul. 3, 2017 (EP) .................................. 17179386

(51) Int. Cl.
C08F 10/02 (2006.01)
B01J 8/18 (2006.01)

(52) U.S. Cl.
CPC ............. *C08F 10/02* (2013.01); *B01J 8/1827* (2013.01); *B01J 8/1863* (2013.01)

(58) Field of Classification Search
CPC ......... C08F 10/02; B01J 8/1827; B01J 8/1863
(Continued)

(56) References Cited

U.S. PATENT DOCUMENTS 6,413,477 B1 7/2002 Govoni et al.
6,518,372 B1 2/2003 Weickert
(Continued)

FOREIGN PATENT DOCUMENTS

CN 102060943 A 5/2011
EP 2722347 A1 4/2014
(Continued)

OTHER PUBLICATIONS

The International Search Report and Written Opinion for PCT/EP2017/078729 dated Jan. 9, 2018.
(Continued)

Primary Examiner — William K Cheung

(57) ABSTRACT

A process for preparing an ethylene polymer including the step of homopolymerizing ethylene or copolymerizing ethylene with one or more comonomers in a gas-phase polymerization reactor including a riser unit wherein growing polymer particles flow upwards under fluidization, fast fluidization or transport conditions and a downcomer wherein growing polymer particles flow downward in a densified form, wherein the hold-up of polymer particles in the downcomer is from 55 wt. % to 80 wt. % of the total hold-up of polymer particles in the gas-phase polymerization reactor.

20 Claims, 1 Drawing Sheet

(58) Field of Classification Search
USPC .......................................................... 526/64
See application file for complete search history.

(56) References Cited

U.S. PATENT DOCUMENTS

| | | |
|---|---|---|
| 6,818,187 B2 | 11/2004 | Govoni et al. |
| 7,514,508 B2 | 4/2009 | Meier et al. |
| 7,553,916 B2 | 6/2009 | Mihan et al. |
| 7,687,588 B2 | 3/2010 | Mei et al. |
| 7,820,116 B2 | 10/2010 | Lee et al. |
| 8,178,632 B2 | 5/2012 | Cavalieri et al. |
| 9,023,945 B2 | 5/2015 | Mavridis et al. |
| 9,932,465 B1 | 4/2018 | Mannebach et al. |
| 2016/0137759 A1 | 5/2016 | Brita et al. |

FOREIGN PATENT DOCUMENTS

| | | |
|---|---|---|
| JP | S5825309 A | 2/1983 |
| JP | 2002537420 A | 11/2002 |
| JP | 2007506818 A | 3/2007 |
| JP | 2008521961 A | 6/2008 |
| KR | 20150119160 A | 10/2015 |
| WO | 9704015 A1 | 2/1997 |
| WO | WO 97/04015 * | 2/1997 |
| WO | 0002929 A1 | 1/2000 |
| WO | 2005019280 A1 | 3/2005 |
| WO | 2006120187 A1 | 11/2006 |
| WO | 2008012144 A1 | 1/2008 |
| WO | 2014202420 A1 | 12/2014 |
| WO | 2016150997 A1 | 9/2016 |

OTHER PUBLICATIONS

D. Geldart, Gas Fluidization Technology, J. Wiley & Sons Ltd., 1986, pp. 155-196.

* cited by examiner

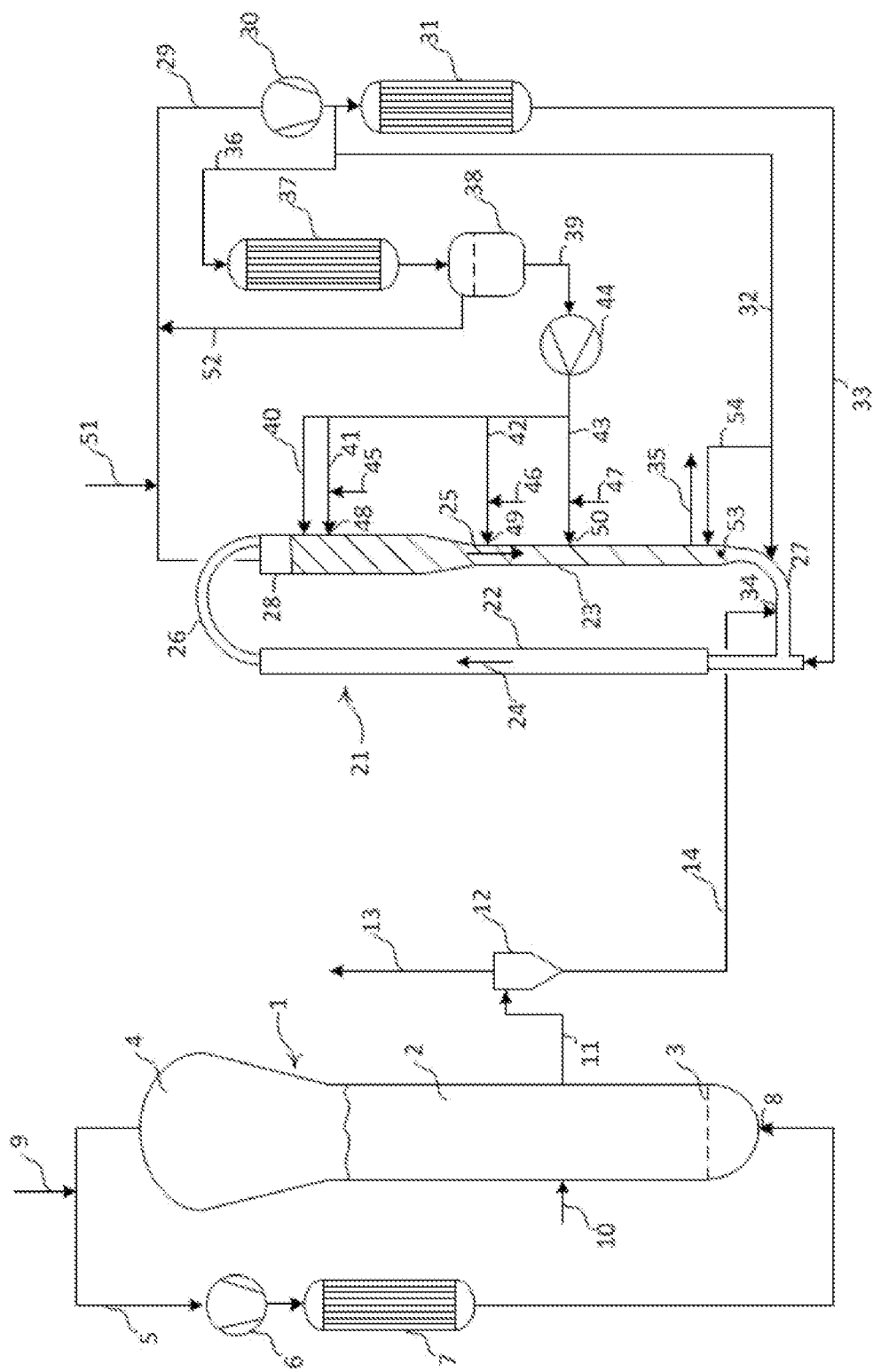

OLEFIN POLYMERIZATION PROCESS IN A GAS-PHASE REACTOR COMPRISING A RISER UNIT AND A DOWNCOMER

This application is the U.S. National Phase of PCT International Application PCT/EP2017/078729, filed Nov. 9, 2017, claiming benefit of priority to European Patent Application No. 16198262.4, filed Nov. 10, 2016, and European Patent Application No. 17179386.2, filed Jul. 3, 2017, the disclosures of which are incorporated herein by reference in their entirety.

FIELD OF THE INVENTION

In general, the present disclosure relates to the field of chemistry. More specifically, the present disclosure relates to polymer chemistry. In particular, the present disclosure provides processes for preparing an ethylene polymer including the step of homopolymerizing ethylene or copolymerizing ethylene with a comonomer in the presence of a polymerization catalyst in a gas-phase polymerization reactor including a riser unit wherein growing polymer particles flow upwards under fluidization, fast fluidization or transport conditions and a downcomer wherein growing polymer particles flow downward in a densified form.

BACKGROUND OF THE INVENTION

Polymerizing olefins in circulating gas-phase polymerization reactor allows for the production of olefin polymers with a high productivity per unit volume of the reactor and with a high flexibility in the composition of the resulting polymers.

Producing polyolefins in gas-phase polymerization processes should avoid or at least to minimize the formation of agglomerates or chunks or of deposits on the reactor wall. In some instances, the agglomerates, chunks, or deposits falling off the reactor wall result in a quality reduction for the prepared olefin polymers and plugging of the product discharge system. In some instances, plugging of the products discharge system results in shutting down the polymerization process. In some instances, these effects are enhanced when the gas-phase alpha-olefin polymerization process is carried out in the presence of highly active catalysts. In some instances, the highly active catalysts are made from or contain the reaction product of an aluminum alkyl with a titanium compound supported on a magnesium halide. In some instances, the formation of such chunks or deposits occurs when the generated heat of polymerization is not dissipated adequately and local hot spots are formed.

In some instances, chunks or deposits are generated during homopolymerizing ethylene or copolymerizing ethylene with one or more comonomers. It is believed that the chucks or deposits result from the mass-referred heat of polymerization being about 50% higher in ethylene polymerization than in propylene polymerization.

SUMMARY OF THE INVENTION

The present disclosure provides a process for preparing an ethylene polymer including the step of homopolymerizing ethylene or copolymerizing ethylene with a comonomer in the presence of a polymerization catalyst in a gas-phase polymerization reactor to yield growing polymer particles including a riser unit wherein growing polymer particles flow upwards under fluidization, fast fluidization or transport conditions and a downcomer wherein growing polymer particles flow downward in a densified form, wherein the hold-up of polymer particles in the downcomer is from 55 wt. % to 80 wt. % of the total hold-up of polymer particles in the gas-phase polymerization reactor.

In some embodiments, the gas-phase polymerization reactor is a multizone circulating reactor wherein the riser unit is a riser wherein growing polymer particles flow upwards under fast fluidization or transport conditions, the riser and the downcomer are interconnected, the polymer particles leaving the riser enter the downcomer, and the polymer particles leaving the downcomer enter the riser, thereby establishing a circulation of polymer particles through the riser and the downcomer.

In some embodiments, the riser unit wherein the growing polymer particles flow upwards includes a fluidized bed of growing polymer particles.

In some embodiments, the gas-phase polymerization reactor includes two or more polymerization zones having a content of inert components in the reaction gas mixture from 30 to 99 vol. %.

In some embodiments, the ethylene polymer is an ethylene copolymer having a comonomer content from 0.01 wt. % to 15 wt. %, prepared by copolymerizing ethylene and a $C_3$-$C_8$-1-alkene.

In some embodiments, the riser unit has a specific pressure reduction $\Delta p/h$ in the range from 500 Pa/m to 3000 Pa/m, with h being the height of the riser unit and $\Delta p$ being the pressure difference between the bottom and the top of the riser unit.

In some embodiments, a barrier fluid in liquid form is fed into the polymerization unit wherein the growing polymer particles flow downward in a densified form.

In some embodiments, the reaction gas mixtures within the riser unit and the downcomer differ in composition and the reaction gas mixtures within the downcomer has a lower ethylene content than the reaction gas mixtures within the riser unit.

In some embodiments, gaseous or liquid streams made from or containing ethylene and optionally a comonomer, inert components, or hydrogen are fed into the downcomer at a monomer feeding point.

In some embodiments, gaseous or liquid streams made from or containing ethylene and optionally a comonomer, inert components or hydrogen are fed to at least 3 monomer feeding points into the downcomer and the hold-up of polymer particles between two adjacent monomer feeding points is no greater than 35 wt. % of the total hold-up of polymer particles in the downcomer.

In some embodiments, the downcomer has sub-zones which differ in the composition of the reaction gas mixtures within the sub-zones of the downcomer.

In some embodiments, the gas-phase polymerization reactor is part of a reactor cascade.

In some embodiments, the reactor cascade includes a fluidized bed reactor upstream of the gas-phase polymerization reactor.

In some embodiments, the polymerization catalyst is a Ziegler- or Ziegler-Natta-catalyst made from or containing the reaction product of an aluminum alkyl with a titanium compound supported on a magnesium halide.

In some embodiments, the ethylene polymer has a density of from 0.916 to 0.964 g/cm$^3$, alternatively from 0.935 to 0.960 g/cm$^3$, determined according to DIN EN ISO 1183-1:2004, Method A (Immersion) and a MFR$_{21.6}$ at a temperature of 190° C. under a load of 21.6 kg, determined according to DIN EN ISO 1133-1:2012-03, of from 0.5 to 300 g/10 min.

BRIEF DESCRIPTION OF THE DRAWINGS

The FIGURE shows schematically a set-up for carrying out the process of the present disclosure.

DETAILED DESCRIPTION OF THE INVENTION

The present disclosure provides a process for preparing an ethylene polymer including the step of homopolymerizing ethylene or copolymerizing ethylene with an olefin as a comonomer in the presence of a polymerization catalyst. In some embodiments, the olefins employed are 1-olefins, which are hydrocarbons having terminal double bonds, without being restricted thereto. In some embodiments, the olefins are functionalized olefinically unsaturated compounds. In some embodiments, the functionalized olefinically unsaturated compounds are ester or amide derivatives of acrylic or methacrylic acid. In some embodiments, the functionalized olefinically unsaturated compounds are acrylates, methacrylates, or acrylonitrile. In some embodiments, the olefins are nonpolar olefinic compounds, including aryl-substituted 1-olefins. In some embodiments, the 1-olefins are linear or branched $C_3$-$C_{12}$-1-alkenes, alternatively linear $C_3$-$C_{10}$-1-alkenes, branched $C_2$-$C_{10}$-1-alkenes, conjugated and nonconjugated dienes, or vinylaromatic compounds. In some embodiments, the linear $C_3$-$C_{10}$-1-alkenes are selected from the group consisting of propylene, 1-butene, 1-pentene, 1-hexene, 1-heptene, 1-octene, and 1-decene. In some embodiments, the branched $C_2$-$C_{10}$-1-alkene is 4-methyl-1-pentene. In some embodiments, the conjugated and nonconjugated dienes is selected from the group consisting of 1,3-butadiene, 1,4-hexadiene and 1,7-octadiene. In some embodiments, the vinylaromatic compounds are selected from the group consisting of styrene and substituted styrene. In some embodiments, the olefins have the double bond as part of a cyclic structure. In some embodiments, the cyclic structure has more than a single ring system. In some embodiments, the cyclic olefin is selected from the group consisting of cyclopentene, norbornene, tetracyclododecene, methylnorbornene, 5-ethylidene-2-norbornene, norbornadiene, and ethylnorbornadiene. In some embodiments, the ethylene is copolymerized with mixtures of two or more olefins.

In some embodiment, the process is for the homopolymerization or copolymerization of ethylene or propylene, alternatively for the homopolymerization or copolymerization of ethylene. In some embodiments, the comonomers in propylene polymerization are up to 40 wt. % of ethylene or 1-butene, alternatively from 0.5 wt. % to 35 wt. % of ethylene or 1-butene. In some embodiments, the comonomers in ethylene polymerization are up to 20 wt. %, alternatively from 0.01 wt. % to 15 wt. %, alternatively from 0.05 wt. % to 12 wt. % of $C_3$-$C_8$-1-alkenes. In some embodiments, the $C_3$-$C_8$-1-alkenes are selected from the group consisting of 1-butene, 1-pentene, 1-hexene and 1-octene. In some embodiments, the process is wherein ethylene is copolymerized with from 0.1 wt. % to 12 wt. % of 1-hexene or 1-butene.

In some embodiments, the polymerization is carried out using Phillips catalysts based on chromium oxide, using Ziegler- or Ziegler-Natta-catalysts, or using single-site catalysts. As used herein, the term "single-site catalysts" refers to catalysts based on chemically uniform transition metal coordination compounds. In some embodiments, mixtures of two or more of these catalysts are used for the polymerization of olefins. As used herein, the term "mixed catalysts" encompasses hybrid catalysts.

In some embodiments, the catalysts are of the Ziegler type. In some embodiments, the Ziegler type catalyst is made from or contains a compound of titanium or vanadium, a compound of magnesium and optionally an electron donor compound or a particulate inorganic oxide as a support material. In some embodiments, the gas-phase alpha-olefin polymerization process is carried out in the presence of a Ziegler type catalyst made from or containing the reaction product of an aluminum alkyl with a titanium compound supported on a magnesium halide.

In some embodiments, the titanium compounds are the halides or alkoxides of trivalent or tetravalent titanium, titanium alkoxy halogen compounds or mixtures of various titanium compounds. In some embodiments, the titanium compounds are $TiBr_3$, $TiBr_4$, $TiCl_3$, $TiCl_4$, $Ti(OCH_3)C_{13}$, $Ti(OC_2H_5)C_{13}$, $Ti(O\text{-}i\text{-}C_3H_7)C_{13}$, $Ti(O\text{-}n\text{-}C_4H_9)C_{13}$, $Ti(OC_2H_5)Br_3$, $Ti(O\text{-}n\text{-}C_4H_9)Br_3$, $Ti(OCH_3)_2C_{12}$, $Ti(OC_2H_5)_2C_{12}$, $Ti(O\text{-}n\text{-}C_4H_9)_2C_{12}$, $Ti(OC_2H_5)_2Br_2$, $Ti(OCH_3)_3C_1$, $Ti(OC_2H_5)_3C_1$, $Ti(O\text{-}n\text{-}C_4H_9)_3C_1$, $Ti(OC_2H_5)_3Br$, $Ti(OCH_3)_4$, $Ti(OC_2H_5)_4$ or $Ti(O\text{-}n\text{-}C_4H_9)_4$. In some embodiments, the titanium compounds are made from or contain chlorine as the halogen. In some embodiments, the titanium halides have only halogen in addition to titanium, alternatively are titanium chlorides, alternatively are titanium tetrachloride. In some embodiments, the vanadium compounds are selected from the group consisting of vanadium halides, vanadium oxyhalides, vanadium alkoxides and vanadium acetylacetonates. In some embodiments, the vanadium compounds have oxidation states 3 to 5.

In some embodiments and in the production of the solid component, at least one compound of magnesium is used. In some embodiments, the magnesium compounds are halogen-based magnesium compounds. In some embodiments, the magnesium compounds are magnesium halides, alternatively the chlorides or bromides and magnesium compounds from which the magnesium halides can be obtained by reaction with halogenating agents. For the present purposes, halogens are chlorine, bromine, iodine or fluorine or mixtures of two or more halogens, alternatively chlorine or bromine, alternatively particular chlorine.

In some embodiments, the halogen-based magnesium compounds are magnesium chlorides or magnesium bromides. In some embodiments, the magnesium compounds from which the halides are obtained are selected from the group consisting of magnesium alkyls, magnesium aryls, magnesium alkoxy compounds or magnesium aryloxy compounds and Grignard compounds. In some embodiments, the halogenating agents are selected from the group consisting of halogens, hydrogen halides, $SiCl_4$ and $CCl_4$, alternatively chlorine or hydrogen chloride.

In some embodiments, halogen-free compounds of magnesium are selected from the group consisting of diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. In some embodiments, halogen-free compounds of magnesium are selected from the group consisting of n-butylethylmagnesium and n-butyloctylmagnesium.

In some embodiments, the Grignard compounds are selected from the group consisting of methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

In some embodiments, the magnesium compounds are selected from the group consisting of magnesium dichloride, magnesium dibromide, and di($C_1$-$C_{10}$-alkyl)magnesium compounds. In some embodiments, the Ziegler- or Ziegler-Natta-catalyst is made from or contains a transition metal selected from titanium, zirconium, vanadium, and chromium.

In some embodiments, electron donor compounds for preparing Ziegler type catalysts are selected from the group consisting of alcohols, glycols, esters, ketones, amines, amides, nitriles, alkoxysilanes, aliphatic ethers, and mixtures thereof.

In some embodiments, the alcohols have the formula $R^1OH$ wherein the $R^1$ group is a $C_1$-$C_{20}$ hydrocarbon group. In some embodiments, $R^1$ is a $C_1$-$C_{10}$ alkyl group. In some embodiments, the alcohol is selected from the group consisting of methanol, ethanol, iso-propanol and n-butanol. In some embodiments, the alcohol is selected from glycols having a total number of carbon atoms lower than 50. In some embodiments, the glycols are the 1,2 or 1,3 glycols having a total number of carbon atoms lower than 25. In some embodiments, the glycols are selected from the group consisting of ethylene glycol, 1,2-propylene glycol and 1,3-propylene glycol. In some embodiments, the esters are alkyl esters of $C_1$-$C_{20}$ aliphatic carboxylic acids, alternatively $C_1$-$C_8$ alkyl esters of aliphatic mono carboxylic acids. In some embodiments, the $C_1$-$C_8$ alkyl esters of aliphatic mono carboxylic acids are selected from the group consisting of ethyl acetate, methyl formate, ethyl formate, methyl acetate, propyl acetate, i-propyl acetate, n-butyl acetate, and i-butyl acetate. In some embodiments, the amines have the formula $NR^2_3$ wherein the $R^2$ groups are, independently, hydrogen or a $C_1$-$C_{20}$ hydrocarbon group with the proviso that the $R^2$ groups are not simultaneously hydrogen. In some embodiments, $R^2$ is a $C_1$-$C_{10}$ alkyl group. In some embodiments, the amines are selected from the group consisting of diethylamine, diisopropylamine and triethylamine. In some embodiments, the amides have the formula $R^3CONR^4_2$ wherein $R^3$ and $R^4$ are, independently, hydrogen or a $C_1$-$C_{20}$ hydrocarbon group. In some embodiments, the amides are selected from the group consisting of formamide and acetamide. In some embodiments, the nitriles have the formula $R^1CN$ where $R^1$ has the same meaning given above. In some embodiments, the nitrile is acetonitrile. In some embodiments, the alkoxysilanes have the formula $R^5_aR^6_bSi(OR^7)_c$, where a and b are integers from 0 to 2, c is an integer from 1 to 4 and the sum (a+b+c) is 4; and $R^5$, $R^6$, and $R^7$, are alkyl, cycloalkyl or aryl radicals with 1-18 carbon atoms optionally containing heteroatoms. In some embodiments, a is 0 or 1, c is 2 or 3, $R^6$ is an alkyl or cycloalkyl group, optionally containing heteroatoms, and $R^7$ is methyl. In some embodiments, the silicon compounds are selected from the group consisting of methyltrimethoxysilane, dimethyldimethoxysilane, trimethylmethoxysilane and t-butyltrimethoxysilane.

In some embodiments, the electron donor compounds are selected from the group consisting of amides, esters, and alkoxysilanes.

In some embodiments, catalysts of the Ziegler type are polymerized in the presence of a cocatalyst. In some embodiments, the cocatalysts are organometallic compounds of metals of Groups 1, 2, 12, 13 or 14 of the Periodic Table of Elements, alternatively organometallic compounds of metals of group 13, alternatively organoaluminum compounds. In some embodiments, the cocatalysts are selected from the group consisting of organometallic alkyls, organometallic alkoxides, and organometallic halides.

In some embodiments, the organometallic compounds are made from or contain lithium alkyls, magnesium or zinc alkyls, magnesium alkyl halides, aluminum alkyls, silicon alkyls, silicon alkoxides and silicon alkyl halides. In some embodiments, the organometallic compounds are made from or contain aluminum alkyls and magnesium alkyls. In some embodiments, the organometallic compounds are made from or contain aluminum alkyls, alternatively trialkylaluminum compounds. In some embodiments, the aluminum alkyls are made from or contain trimethylaluminum, triethylaluminum, tri-isobutylaluminum, or tri-n-hexylaluminum.

The process of the present disclosure is characterized in that the polymerization is carried out in a gas-phase polymerization reactor including a riser unit wherein growing polymer particles flow upwards under fluidization, fast fluidization or transport conditions and a downcomer wherein growing polymer particles flow downward in a densified form. According to the process of the present disclosure, a gas-phase polymerization reactor provides a container wherein the polymerization is carried out in one interconnected gas-phase. The pressures in the different polymerization zones within this container are the same, apart from pressure differences resulting from flow resistances in gas-phases having high flow velocities, and the conditions in the polymerization zones are not variable independently. A polymerization zone is a part of the gas-phase polymerization reactor wherein the polymerization takes place under identical conditions. For a polymerization, in which a thorough mixing of the polymer particles occurs, the polymerization zone is the volume of this mixed bed of polymer particles. In some embodiments, a thorough mixing of the polymer particles occurs during polymerization in a fluidized-bed or in a stirred bed of polymer particles. For a polymerization, in which the polymer particles are transported through a part of the reactor, a polymerization zone is the volume between two monomer feeding points. As used herein, a monomer feeding point is defined as a position along the path of the transported polymer particles or a height of a vertically oriented reactor part of the polymerization reactor whereat ethylene and optionally one or more comonomers are fed into the reactor through one or more feeding lines.

In some embodiments, the riser unit wherein the growing polymer particles flow upwards includes a fluidized bed of growing polymer particles. The riser unit then operates as a thoroughly mixed gas-phase reactor. In some embodiments, the thoroughly mixed gas-phase reactor is a fluidized bed reactor.

Fluidized-bed reactors are reactors wherein the polymerization takes place in a bed of polymer particles maintained in a fluidized state by feeding in a reaction gas mixture at the lower end of a reactor and taking off the gas again at the reactor's upper end. In some embodiments, the reaction gas mixture is fed below a gas distribution grid having the function of dispensing the gas flow. The reaction gas mixture is then returned to the lower end to the reactor via a recycle line equipped with a compressor and a heat exchanger for removing the heat of polymerization. The velocity of the reaction gas mixture is high enough to fluidize the mixed bed of finely divided polymer present in the tube serving as polymerization zone and remove the heat of polymerization.

In some embodiments, a polymerization unit including a fluidized bed of growing polymer particles is employed as the riser unit, the downcomer is positioned within, around or adjacent to the gas-phase reactor. In some embodiments, two or more separated polymerization units wherein the growing polymer particles flow downward in a densified form, as the downcomer are used.

In some embodiments, the riser unit is a riser wherein an upward movement of growing polymer particles occurs under fast fluidization or transport conditions. Fast fluidization conditions inside the riser are established by feeding a reaction gas mixture at a velocity higher than the transport velocity of the polymer particles. In some embodiments, the velocity of the reaction gas mixture is between 0.5 and 15 m/s, alternatively between 0.8 and 5 m/s. As used herein, the terms "transport velocity" and "fast fluidization conditions" are used as defined in "D. Geldart, Gas Fluidization Technology, page 155 et seq., J. Wiley & Sons Ltd., 1986".

Due to the hydrostatic pressure of the gas-polymer mixture within the riser unit, there exists a pressure difference between the bottom of the riser unit and the top of the riser unit. Because the density of the polymer in the polymer particles is much higher than the density of the surrounding gas, this pressured difference $\Delta p$ between the bottom and the top of the riser unit is correlated to the volume fraction of polymer in the gas-polymer mixture within the riser unit and the specific pressure reduction $\Delta p/h$ in the riser unit, with h being the height of the riser unit, is a measure for this volume fraction.

In some embodiments, the specific pressure reduction $\Delta p/h$ in the riser unit is in the range from 500 Pa/m to 3000 Pa/m, alternatively from 1000 Pa/m to 2500 Pa/m.

The gas-phase reactor of the present disclosure includes a polymerization zone wherein the growing polymer particles flow downward in a densified form. In some instances, the polymerization unit is called a "downcomer," a "moving bed," or a "settled bed" unit or reactor. As used herein, the term "densified form" of the polymer refers to the ratio between the mass of polymer and the reactor volume is higher than 80% of the "poured bulk density" of the resulting polymer. For example, when a polymer bulk density is equal to 420 kg/m$^3$, a "densified form" of the polymer would have the polymer mass/reactor volume ratio of at least 336 kg/m$^3$. In some instances, "poured bulk density" of a polymer is measured according to DIN EN ISO 60: 1999. As used herein, the density of solid inside the reactor is defined as the mass of polymer per volume of reactor occupied by the polymer.

In some embodiments, a downcomer is a polymerization unit containing a bed of growing polymer particles, which moves downwards in a plug flow mode. As used herein, "plug flow mode" refers to there being little or no backmixing of the polymer particles. In some embodiments, the polymer particles flow downwards in the downcomer with a velocity of from 0.01 to 0.7 m/s, alternatively from 0.1 to 0.6 m/s, alternatively from 0.15 to 0.5 m/s.

In some embodiments, for replacing reacted olefins and controlling the gas flow within the downcomer, gaseous or liquid feed streams are introduced at one or more positions into the downcomer. In some embodiments, the feed streams are made from or contain ethylene. In some embodiments, the feed streams are further made from or contain one or more comonomers, inert components, or hydrogen. In some embodiments, the inert component is propane. In some embodiments, depending on the amounts of added gaseous or liquid feed streams to the downcomer and the pressure conditions within the downcomer, the gaseous medium surrounding the polymer particles moves downwards concurrently with the polymer particles or upward countercurrently to the polymer particles. In some embodiments, when feeding liquid streams to the downcomer, these liquid streams vaporize within the downcomer and contribute to the composition of the reaction gas mixture within the downcomer. In some embodiments, when operating the downcomer with more than one feed stream, the feeding points for introducing the feed streams into the downcomer are evenly distributed over the height of the downcomer.

In some embodiments, the bottom of the downcomer is equipped with a control valve for controlling the flow of the growing polymer particles from the downcomer into the riser unit. In some embodiments, the control valve is a mechanical valve. In some embodiments, the control valve is a simple or double butterfly valve or a ball valve. In some embodiments, a stream of a gas or "dosing gas" is fed into the lower part of the downcomer at one or more positions shortly above the control valve to facilitate the flow of the growing polymer particles through the control valve downstream of the compressor. In some embodiments, the dosing gas is taken from a recycling stream of unreacted monomers. In some embodiments, by varying the opening of the control valve or the flow rate of the dosing gas, the velocity of the polymer particles within the downcomer is adjusted.

In some embodiments, the gas-phase polymerization reactor is a multizone circulating reactor. In some embodiments, the reactors are as described in Patent Cooperation Treaty Publication Nos. WO 97/04015 A1 and WO 00/02929 A1 and have two interconnected polymerization zones, a riser wherein the growing polymer particles flow upward under fast fluidization or transport conditions, and a downcomer wherein the growing polymer particles flow in a densified form under the action of gravity. The polymer particles leaving the riser enter the downcomer and the polymer particles leaving the downcomer are reintroduced into the riser, thereby establishing a circulation of polymer between the two polymerization zones and the polymer is passed alternately a plurality of times through these two zones. In such polymerization reactors, a solid/gas separator is arranged above the downcomer to separate the polyolefin and reaction gaseous mixture coming from the riser. The growing polyolefin particles enter the downcomer and the separated reaction gas mixture of the riser is continuously recycled through a gas recycle line to one or more points of reintroduction into the polymerization reactor. In some embodiments, the major part of the recycle gas is recycled to the bottom of the riser. In some embodiments, the recycle line is equipped with a compressor and a heat exchanger for removing the heat of polymerization. In some embodiments, a line for the catalyst feed is arranged on the riser and a polymer discharge system is located in the bottom portion of the downcomer. In some embodiments, the introduction of make-up monomers, comonomers, hydrogen and/or inert components occur at various points along the riser and the downcomer.

Polymerization in a polymerization reactor having a riser, which operates under fast fluidization or transport conditions, provides that the growing polymer particles pass repeatedly the polymerization zones of the polymerization reactor. In some embodiments, a gas-phase polymerization reactor yields homogeneous multi-modal ethylene polymers with improved polymer property combinations.

In some embodiments, the polymerization is carried out in the presence of an inert gas. In some embodiments, the inert gas is selected from the group consisting of nitrogen and an alkane having from 1 to 10 carbon atoms. In some embodiments, the alkane is selected from the group consisting of methane, ethane, propane, n-butane, isobutane, n-pentane, isopentane or n-hexane and mixtures thereof. In some embodiments, nitrogen or propane is used in combination with further alkanes. In some embodiments, the polymerization is carried out in the presence of a $C_3$-$C_5$ alkane as polymerization diluent, alternatively in the presence of propane. In some embodiments, the reaction gas mixture is made from or contains additional components such as molecular weight regulators like hydrogen or polymerization inhibitors like carbon monoxide or water. In some embodiments, components of the reaction gas mixture are fed into the gas-phase polymerization reactor in gaseous form or as liquid which vaporizes within the reactor. The reaction gas mixtures within the reactor additionally are made from or contain the olefins to be polymerized.

In some embodiments, the gas-phase polymerization reactor includes two or more polymerization zones and the polymerization zones have a content of inert components in the reaction gas mixture from 30 to 99 vol. %, alternatively from 50 to 95 vol. %, alternatively from 60 to 90 vol. %.

In some embodiments, the reaction gas mixture leaving the riser unit is partially or totally prevented from entering the downcomer for establishing different polymerization conditions between the riser unit and at least a part of the downcomer. In some embodiments, feeding a barrier fluid in form of a gas and/or liquid mixture into the downcomer partially or totally prevents the reaction gas mixture from entering the downcomer, alternatively in the upper part of the downcomer. In some embodiments, the barrier fluid has a composition different from that of the gas mixture present in the riser unit. In some embodiments, the amount of added barrier fluid is adjusted such that an upward flow of gas countercurrent to the flow of the polymer particles is generated, alternatively at the top thereof, thereby providing a barrier to the gas mixture entrained with the particles coming from the riser unit.

In some embodiments, the barrier fluid comes from a recycle gas stream. In some embodiments, the barrier fluid is obtained by partly condensing the stream. In some embodiments, the barrier fluid contains, besides the monomers to be polymerized, inert compounds used as a polymerization diluent, hydrogen or other components of the reaction gas mixture. In some embodiments, the polymerization diluents are nitrogen or alkanes having from 1 to 10 carbon atoms.

In some embodiments, the preparation of the barrier fluid is accomplished by separating off a part of the recycle gas stream, passing the separated gas through a heat-exchanger for partly condensing and separating the resulting liquid-gas mixture in a liquid and a gaseous stream. In some embodiments, the separating step occurs downstream of the compressor and upstream of the heat exchanger comprised in the recycle line. In some embodiments, the barrier fluid has a composition such that when the barrier fluid is vaporized, the gas produced has less than 0.5 vol. % hydrogen, alternatively less than 0.2 vol. % hydrogen, alternatively less than 0.1 vol. % hydrogen. In some embodiments, a feed stream made from or containing ethylene and optionally one or more comonomers is introduced into the downcomer together with the barrier fluid or in close proximity to the feeding point of the barrier fluid.

In some embodiments, the barrier fluid is fed in liquid form into the upper part of the polymerization unit wherein the growing polymer particles flow downward in a densified form.

In some embodiments, the reaction gas mixtures within the riser unit and the downcomer differ in their composition and the reaction gas mixture within the downcomer has a lower ethylene content than the reaction gas mixture within the riser unit. In some embodiments, the reaction gas mixture within the downcomer has an average ethylene content from 1 to 15 vol. %, alternatively from 2 to 12 vol. %, alternatively from 4 to 10 vol. % and the reaction gas mixture within the riser unit has an ethylene content from 1 to 30 vol. %, alternatively from 3 to 25 vol. %, alternatively from 5 to 20 vol. %. In some embodiments, the ethylene content of the reaction gas mixture within in the riser unit is from 1.5 to 3 times, alternatively from 1.8 to 2.5 times the average ethylene content of the reaction gas mixture within the downcomer.

In some embodiments, the polymerization unit wherein the growing polymer particles flow downward in a densified form has at least two sub-zones which differ in the composition of the reaction gas mixture within these sub-zones of the downcomer. In some embodiments, the different gas compositions are established by introducing liquid or gaseous feed streams into a middle part of the downcomer. In case of an overall downward gas stream, the gas composition in a lower part of the downcomer is then a combination of the gas streaming downwards through the upper part of the downcomer and the gas components derived from the additionally injected liquid or gaseous feed streams dosed into the middle part(s) of the downcomer. In case of an overall upward gas stream, the gas composition in an upper part of the downcomer is then a combination of the gas streaming upwards through the lower part of the downcomer and the gas components derived from the additionally injected liquid or gaseous feed streams dosed into the middle part(s) of the downcomer. In some embodiments, a major part of the streams fed to the downcomer are fed to a middle part of the downcomer, thereby creating an upward gas stream in one or more upper sub-zones of the downcomer and a downward gas stream in one or more lower sub-zones of the downcomer. In some embodiments, the gas compositions in the respective sub-zones is established by feeding additional feed streams in the vicinity of the feeding point(s) of the major part of feed stream(s).

In some embodiments, the different sub-zones of the downcomer differ in their composition from the composition of the reaction gas mixture in the riser unit. In some embodiments, at least one of the sub-zones of the downcomer has a composition of the reaction gas mixture which is similar to the gaseous composition reacting in the riser unit. In some embodiments, the sub-zone is the lowest sub-zone. When producing olefin polymers of different composition in different polymerization zones of a circulating gas-phase polymerization reactor, operating a part of the downcomer under conditions which are similar to the gaseous composition reacting in the riser unit allows for increasing the proportion of the polymer component obtained in the riser unit in the final olefin polymer.

The process of the present disclosure is characterized in that the hold-up of polymer particles in the downcomer is from 55 wt. % to 80 wt. % of the total hold-up of polymer particles in the gas-phase polymerization reactor. In some embodiments, the hold-up of polymer particles in the downcomer is from 60 wt. % to 75 wt. % of the total hold-up of polymer particles in the gas-phase polymerization reactor. The hold-up of polymer in a polymerization zone of the polymerization reactor is the amount of polymer in this polymerization zone. The hold-up is determined by the density within the polymerization zone and the volume within the polymerization zone occupied by polymer particles. The hold-up of the polymer particles in the riser unit is mainly given by the volume of the riser unit and the density of the gas-polymer mixture within the riser unit while the density of the gas-polymer mixture within the riser unit depends on the amount of gas used to fluidize or fast-fluidize the polymer particles. The hold-up of the polymer particles in the downcomer is mainly given by the volume of the downcomer, the filling level of the polymer particle within the downcomer and the bulk density of the polymer particles within the downcomer. In some embodiments, when establishing an upward flow of the gaseous medium surrounding the polymer particles within the downcomer, the particle density is reduced within the downcomer by increasing the upward gas velocity within the downcomer, thereby loosening the polymer particles.

The amount of polymer produced in a polymerization zone depends on the hold-up of polymer particles in this polymerization zone because, in catalytic olefin polymerization, the active catalyst is imbedded into the growing polymer particles. However, the amount of polymer that is produced also depends on additional factors such as the monomer concentration in the polymerization zone or the polymerizations temperature. When keeping the split of polymer produced in the riser and polymer produced in the downcomer constant, increasing the hold-up of polymer particles in the downcomer allows reducing the concentration of monomer in the downcomer. As a consequence, the generated heat of polymerization per volume is reduced and the risk for local overheating decreases.

Furthermore, the possibility for establishing two or more sub-zones of different reaction gas compositions in the downcomer increases the options for tailoring the composition of the final polymer.

Carrying out the polymerization with a hold-up of polymer particles in the downcomer of from 55 wt. % to 80 wt. % of the total hold-up of polymer particles in the gas-phase polymerization reactor provides the polymerization being conducted with a high space-time yield. In some embodiments, operating a polymerization zone of a gas-phase polymerization reactor as a riser involves large quantities of gas for transporting the growing polymer particles within the riser upwards. The volume fraction of polymer particles in the gas-polymer mixture within the riser is low, which is adverse to the space-time yield of a circulating gas-phase polymerization reactor. In contrast, the downcomer wherein growing polymer particles flow downward in a densified form has a relatively large volume fraction of polymer particles in the gas-polymer mixture, resulting in a high space-time yield.

Operating the polymerization process with a hold-up of polymer particles in the downcomer in the range from 55 wt. % to 80 wt. % of the total hold-up of polymer particles in the gas-phase reactor further allows the reactor with a small volume for the riser unit. A smaller compressor can fluidize or fast-fluidize the polymer particles. Consequently, the efforts for constructing and operating the reactor are reduced. Moreover, the polymerization conditions within the riser unit allow for varying these conditions within the riser unit without being confronted with operational problems. An example of a condition is increasing the monomer partial pressures. Examples of avoidable operational problems are the formation of chunks or agglomerates or the plugging of a product discharge system.

In some embodiments, gaseous or liquid streams made from or containing ethylene and optionally one or more comonomers, inert components and/or hydrogen are fed to at least 3 monomer feeding points into the downcomer, and the hold-up of polymer particles between two adjacent monomer feeding points is no greater than 35 wt. % of the total hold-up of polymer particles in the downcomer. In some embodiments, gaseous or liquid streams made from or containing ethylene and optionally one or more comonomers, inert components and/or hydrogen are fed to at least 4 monomer feeding points into the downcomer and the hold-up of polymer particles between two adjacent monomer feeding points is no greater than 25 wt. % of the total hold-up of polymer particles in the downcomer. In some embodiments, gaseous or liquid streams made from or containing ethylene and optionally one or more comonomers, inert components and/or hydrogen are fed to at least 5 monomer feeding points into the downcomer and the hold-up of polymer particles between two adjacent monomer feeding points is no greater than 20 wt. % of the total hold-up of polymer particles in the downcomer.

In some embodiments, polymerization in the gas-phase polymerization reactor is carried out in a condensing or super-condensing mode wherein part of the circulating reaction gas mixture is cooled to below the dew point and returned to the reactor separately as a liquid and a gas-phase or together as a two-phase mixture, thereby making use of the enthalpy of vaporization for cooling the reaction gas.

In some embodiments, the gas-phase polymerization reactor including the riser unit and the downcomer is part of a reactor cascade. In some embodiments, the further polymerization reactors of the reactor cascade are low-pressure polymerization reactors such as gas-phase reactors or suspension reactors. In some embodiments, if the polymerization process of the reactor cascade includes a polymerization in suspension, the suspension polymerization is carried out upstream of the gas-phase polymerization. In some embodiments, the reactors for carrying out such a suspension polymerization are loop reactors or stirred tank reactors. In some embodiments, the suspension media are inter alia inert hydrocarbons or the monomers. In some embodiments, the hydrocarbons are isobutane or mixtures of hydrocarbons. In some embodiments, the additional polymerization stages are carried out in suspension and include a pre-polymerization stage. In some embodiments, if the multistage polymerization of olefins includes additional polymerization stages carried out in gas-phase, the additional gas-phase polymerization reactors are gas-phase reactors like horizontally or vertically stirred gas-phase reactors, fluidized-bed reactors or multizone circulating reactors. In some embodiments, the additional gas-phase polymerization reactors are arranged downstream or upstream of the gas-phase polymerization reactor. In some embodiments, the gas-phase polymerization reactor including the riser unit and the downcomer is part of a reactor cascade wherein a fluidized-bed polymerization reactor is arranged upstream of the gas-phase polymerization reactor.

The FIGURE shows schematically a set-up of a polymerization reactor cascade including a fluidized-bed reactor and a multizone circulating reactor for carrying out the process of the present disclosure.

The first gas-phase reactor, fluidized-bed reactor (1), includes a fluidized bed (2) of polyolefin particles, a gas distribution grid (3) and a velocity reduction zone (4). In some embodiments, the velocity reduction zone (4) has an increased diameter compared to the diameter of the fluidized-bed portion of the reactor. The polyolefin bed is kept in a fluidization state by an upward flow of gas fed through the gas distribution grid (3) placed at the bottom portion of the reactor (1). The gaseous stream of the reaction gas mixture leaving the top of the velocity reduction zone (4) via recycle line (5) is compressed by compressor (6), transferred to a heat exchanger (7) wherein the reaction gas mixture is cooled, and then recycled to the bottom of the fluidized-bed reactor (1) at a point below the gas distribution grid (3) at position (8). In some embodiments, the recycle gas is cooled to below the dew point of one or more of the recycle gas components in the heat exchanger, thereby operating the reactor with condensed material, that is, in the condensing mode. In some embodiments, the recycle gas is made from or contains unreacted monomers, inert condensable gases, and inert non-condensable gases. In some embodiments, the inert condensable gases are alkanes. In some embodiments, the inert non-condensable gas is nitrogen. In some embodiments, make-up monomers, hydrogen, and optional inert gases or process additives are fed into the reactor (1) at various positions. In some embodiments, the components are fed via line (9) upstream of the compressor (6). In some embodiments, the catalyst is fed into the reactor (1) via a line (10). In some embodiments, line (10) is placed in the lower part of the fluidized bed (2).

The polyolefin particles obtained in fluidized-bed reactor (1) are discontinuously discharged via line (11) and fed to a solid/gas separator (12). The gaseous mixture coming from the fluidized-bed reactor (1) enters the second gas-phase reactor. The gas leaving solid/gas separator (12) exits the reactor via line (13) as off-gas while the separated polyolefin particles are fed via line (14) to the second gas-phase reactor.

The second gas-phase reactor is a multizone circulating reactor (21) having a riser (22) and a downcomer (23) which are repeatedly passed by the polyolefin particles. Within riser (22), the polyolefin particles flow upward under fast fluidization conditions along the direction of arrow (24). Within the downcomer (23) the polyolefin particles flow downward under the action of gravity along the direction of the arrow (25). The riser (22) and the downcomer (23) are interconnected by the interconnection bends (26) and (27).

After flowing through the riser (22), the polyolefin particles and the reaction gas mixture leave riser (22) and conveyed to a solid/gas separation zone (28). In some embodiments, solid/gas separation is effected by a centrifugal separator like a cyclone. From the separation zone (28) the polyolefin particles enter downcomer (23).

The reaction gas mixture leaving the separation zone (28) is recycled to the riser (22) by a recycle line (29), equipped with a compressor (30) and a heat exchanger (31). Between the compressor (30) and the heat exchanger (31), the recycle line (29) splits and the gaseous mixture is divided into two separated streams: line (32) conveys a part of the recycle gas into the interconnection bend (27) while line (33) conveys another part the recycle gas to the bottom of riser (22), thereby establishing fast fluidization conditions therein.

The polyolefin particles coming from the first gas-phase reactor via line (14) enter the multizone circulating reactor (21) at the interconnection bend (27) in position (34). The polyolefin particles obtained in multizone circulating reactor (21) are continuously discharged from the bottom part of downcomer (23) via the discharge line (35).

A part of the gaseous mixture leaving the separation zone (28) exits the recycle line (29) after having passed the compressor (30) and is sent through line (36) to the heat exchanger (37), where the gaseous mixture is cooled to a temperature at which the monomers and the optional inert gas are partially condensed. A separating vessel (38) is placed downstream of the heat exchanger (37). The separated liquid is withdrawn from the separating vessel (38) via line (39) and fed to downcomer (23) through lines (40), (41), (42) and (43) by a pump (44), wherein the feed stream introduced via line (40) is supplied to generate the barrier for preventing the reaction gas mixture of the riser (22) from entering the downcomer (23). In some embodiments, make-up monomers, make-up comonomers, and optionally inert gases and/or process additives are introduced via lines (45), (46) and (47) into lines (41), (42) and (43) and then fed into the downcomer (23) at monomer feeding points (48), (49) and (50). In some embodiments, make-up monomers, make-up comonomers, and optionally inert gases and/or process additives are further introduced into the recycle line (29) via line (51). The gaseous mixture obtained as gas-phase in the separating vessel (38) is recirculated to recycle line (29) through line (52).

The bottom of the downcomer (23) is equipped with a control valve (53) having an adjustable opening for adjusting the flow of polyolefin particles from downcomer (23) through the interconnection bend (27) into the riser (22). Above the control valve (53), amounts of a recycle gas mixture coming from the recycle line (29) through line (54) are introduced into the downcomer (23) to facilitate the flow of the polyolefin particles through the control valve (53).

In some embodiments, the process of the present disclosure yields polyethylenes having a density of from 0.916 to 0.964 g/cm$^3$, alternatively from 0.935 to 0.960 g/cm$^3$, determined according to DIN EN ISO 1183-1:2004, Method A (Immersion), and a MFR$_{21.6}$ at a temperature of 190° C. under a load of 21.6 kg, determined according to DIN EN ISO 1133-1:2012-03, of from 0.5 to 300 g/10 min, alternatively of from 1 to 100 g/10 min, alternatively of from 1.2 to 100 g/10 min alternatively of from 1.5 to 50 g/10 min. In some embodiments, the polyethylenes are useful for preparing blow molded articles.

EXAMPLES

For determining the amount of chunks, the polymer powder discharged from the multizone circulating reactor (MZCR) was passed through a vibrating screen having screen openings of 10 mm. The material remaining on the screen corresponds to the amount of chunks having a diameter of more than 10 mm.

The melt flow rate MFR$_{21.6}$ was determined according to DIN EN ISO 1133-1:2012-03 at a temperature of 190° C. under a load of 21.6 kg.

The melt flow rate MFR$_5$ was determined according to DIN EN ISO 1133-1:2012-03 at a temperature of 190° C. under a load of 5 kg.

The melt flow rate MFR$_{2.16}$ was determined according to DIN EN ISO 1133-1:2012-03 at a temperature of 190° C. under a load of 2.16 kg.

The Flow Rate Ratio FRR is the ratio of MFR$_{21.6}$/MFR$_5$.

The density was determined according to DIN EN ISO 1183-1:2004, Method A (Immersion) with compression molded plaques of 2 mm thickness. The compression molded plaques were prepared with a defined thermal history: pressed at 180° C., 20 MPa for 8 min with subsequent crystallization in boiling water for 30 min.

Example 1

A polyethylene was prepared in a cascade of a fluidized-bed reactor and a multizone circulating reactor (MZCR) having two interconnected reaction zones as shown in the FIGURE.

9.1 g/h of a Ziegler-Natta catalyst, which was prepared according to Example 1a of Patent Cooperation Treaty Publication No. WO 2014/202420 A1 with a molar feed ratio of electron donor/Ti of 8, were fed using 5 kg/h of liquid propane to a first stirred precontacting vessel, into which additionally triisobutylaluminum (TIBA), diethylaluminum chloride (DEAC) and tetrahydrofuran (THF) were dosed. The weight ratio of triisobutylaluminum to diethylaluminum chloride was 7:1. The weight ratio of the aluminum alkyls to the catalyst solid was 5:1. The weight ratio of the aluminum alkyls to THF was 70:1. The first precontacting vessel was kept at 50° C. with a residence time of 30 minutes. The catalyst suspension of the first precontacting vessel was continuously transferred to a second stirred precontacting vessel, which was operated with a residence time of 30 minutes and kept at 50° C. The catalyst suspension was then transferred continuously to a fluidized-bed reactor (1) via line (10).

In the fluidized-bed reactor (1), ethylene was polymerized in the presence of propane as an inert diluent using hydrogen as a molecular weight regulator. 51 kg/h of ethylene and 140 g/h of hydrogen were fed to the fluidized-bed reactor (1) via line (9). No comonomer was added. The polymerization was carried out at a temperature of 80° C. and a pressure of 2.9 MPa. The selected feed rates resulted in the reactor in an ethylene concentration of 11.1 vol. % and a hydrogen concentration of 14.4 vol. %.

The polyethylene obtained in the fluidized-bed reactor (1) had an $MFR_{2.16}$ of 8 g/10 min and a density of 0.967 g/cm³.

The polyethylene obtained in the fluidized-bed reactor (1) was continuously transferred to a multizone circulating reactor (21), which was operated at a pressure of 2.5 MPa and a temperature of 85° C. measured at the beginning of line (29) where the reaction gas mixture has just left separation zone (28). The riser (22) had an internal diameter of 174 mm and a length of 18.6 m. The downcomer (23) had a total length of 17.6 m, divided into an upper part of 4.5 m with an internal diameter of 306 mm, a lower part of 12.7 m with an internal diameter of 192 mm and in-between the upper part and the lower part a conical part having a length of 0.43 m. The final polymer was discontinuously discharged via line (35).

To prevent the reaction gas mixture of the riser (22) from entering the downcomer (23), 330 kg/h of a liquid stream were fed as barrier fluid into the upper part of the downcomer (23) via line (40). The liquid for generating the barrier originated from partially condensing recycle gas mixture in heat exchanger (37) at working conditions of 52° C. and 2.5 MPa and separating liquid and gaseous components in separating vessel (38).

Additional monomers were fed to the downcomer (23) at three monomer feeding points below the barrier. The combined quantity of fresh monomers fed into the downcomer were 24 kg/h of ethylene and 0.6 kg/h of 1-hexene. Additionally, 6 kg/h of propane, 25 kg/h of ethylene and 70 g/h of hydrogen were fed through line (51) into the recycle line (29).

Of the final ethylene polymer produced in the cascade of the fluidized-bed reactor (1) and the multizone circulating reactor (21), 50% by weight were produced in the first reactor and 50% by weight were produced in the second reactor.

The polymerization conditions within the riser and the downcomer of the MZCR are indicated in Table 1. Table 1 further reports the properties of the final ethylene polymer discharged from the multizone circulating reactor.

Example 2

The polymerization of Example 1 was repeated under identical conditions except that a multizone circulating reactor (MZCR) was employed in which the riser (22) had an internal diameter of 147 mm and the lower part of the downcomer (23) had an internal diameter of 212 mm.

The polymerization conditions within the riser and the downcomer of the MZCR are indicated in Table 1. Table 1 further reports the properties of the final ethylene polymer discharged from the multizone circulating reactor.

Comparative Example A

The polymerization of Example 1 was repeated under identical conditions except that a multizone circulating reactor (MZCR) was employed in which the riser (22) had an internal diameter of 207 mm and the lower part of the downcomer (23) had an internal diameter of 158 mm.

The polymerization conditions within the riser and the downcomer of the MZCR are indicated in Table 1. Table 1 further reports the properties of the final ethylene polymer discharged from the multizone circulating reactor.

TABLE 1

|  | Example 1 | Example 2 | Comparative Example A |
|---|---|---|---|
| Riser | | | |
| Ethylene [vol. %] | 12.9 | 17.2 | 10.1 |
| Hydrogen [vol. %] | 3.4 | 4.7 | 2.5 |
| 1-Hexene [vol. %] | 0.50 | 0.65 | 0.40 |
| Downcomer | | | |
| Ethylene [vol. %] | 5.1 | 3.4 | 8.2 |
| Hydrogen [vol. %] | 0.24 | 0.23 | 0.21 |
| 1-Hexene [vol. %] | 0.9 | 0.9 | 0.8 |
| MZCR conditions: | | | |
| Volume downcomer [m³] | 0.527 | 0.607 | 0.409 |
| Volume riser [m³] | 0.442 | 0.316 | 0.623 |
| Hold-up downcomer [kg] | 161 | 186 | 125 |
| Hold-up riser [kg] | 87 | 62 | 123 |
| Hold-up proportion downcomer [%] | 65 | 75 | 50 |
| Hold-up proportion riser [%] | 35 | 25 | 50 |
| Production rate downcomer [kg/h] | 24.9 | 24.8 | 25.1 |
| Production rate riser [kg/h] | 25.1 | 25.2 | 24.9 |
| Space-time-yield MZCR [kg/h m³] | 103.2 | 108.4 | 96.9 |
| Split riser/downcomer [wt.-%/wt.-%] | 50.2/49.8 | 50.4/49.6 | 49.8/50.2 |
| Chunks (>10 mm) [g/h] | 5 | 0 | 80 |
| Final polymer properties: | | | |
| $MFR_{21.6}$ [g/10 min] | 13.6 | 14.2 | 13.9 |
| FRR | 19 | 20 | 19 |
| Density [g/cm³] | 0.952 | 0.953 | 0.953 |

What is claimed is:

1. A process for preparing an ethylene polymer comprising the step of:

homopolymerizing ethylene or copolymerizing ethylene with a comonomer in the presence of a polymerization catalyst in a gas-phase polymerization reactor to yield growing polymer particles, the gas-phase polymerization reactor comprising a riser unit wherein growing polymer particles flow upwards under fluidization, fast fluidization or transport conditions, and a downcomer wherein growing polymer particles flow downward in a densified form, wherein the hold-up of polymer particles in the downcomer is from 55 wt. % to 80 wt. % of the total hold-up of polymer particles in the gas-phase polymerization reactor.

2. The process of claim 1, wherein the gas-phase polymerization reactor is a multizone circulating reactor wherein the riser unit is a riser wherein growing polymer particles flow upwards under fast fluidization or transport conditions, the riser and the downcomer are interconnected, the polymer particles leaving the riser enter the downcomer, and the polymer particles leaving the downcomer enter the riser, thereby establishing a circulation of polymer particles through the riser and the downcomer.

3. The process of claim 1, wherein the riser unit wherein the growing polymer particles flow upwards comprises a fluidized bed of growing polymer particles.

4. The process of claim 1, wherein the gas-phase polymerization reactor comprises two or more polymerization zones, having a content of inert components in the reaction gas mixture from 30 to 99 vol. %.

5. The process of claim 1, wherein the ethylene polymer is an ethylene copolymer having a comonomer content from 0.01 wt. % to 15 wt. %, prepared by copolymerizing ethylene and a $C_3$-$C_8$-1-alkene.

6. The process of claim 1, wherein the riser unit has a specific pressure reduction $\Delta p/h$ in the range from 500 Pa/m to 3000 Pa/m, with h being the height of the riser unit and $\Delta p$ being the pressure difference between the bottom and the top of the riser unit.

7. The process of claim 1, wherein a barrier fluid in liquid form is fed into the polymerization unit wherein the growing polymer particles flow downward in a densified form.

8. The process of claim 1, wherein the reaction gas mixtures within the riser unit and the downcomer differ in composition and the reaction gas mixtures within the downcomer has a lower ethylene content than the reaction gas mixtures within the riser unit.

9. The process of claim 1, wherein gaseous or liquid streams comprising ethylene and optionally a comonomer, inert components, or hydrogen are fed into the downcomer at a monomer feeding point.

10. The process of claim 9, wherein gaseous or liquid streams comprising ethylene and optionally a comonomer, inert components or hydrogen are fed to at least 3 monomer feeding points into the downcomer and the hold-up of polymer particles between two adjacent monomer feeding points is no greater than 35 wt. % of the total hold-up of polymer particles in the downcomer.

11. The process of claim 1, wherein the downcomer has sub-zones which differ in the composition of the reaction gas mixtures within the sub-zones of the downcomer.

12. The process of claim 1, wherein the gas-phase polymerization reactor is part of a reactor cascade.

13. The process of claim 12, wherein the reactor cascade comprises a fluidized bed reactor upstream of the gas-phase polymerization reactor.

14. The process of claim 1, wherein the polymerization catalyst is a Ziegler-catalyst or a Ziegler-Natta-catalyst comprising the reaction product of an aluminum alkyl with a titanium compound supported on a magnesium halide.

15. The process of claim 1, wherein the ethylene polymer has a density of from 0.916 to 0.964 g/cm$^3$, determined according to DIN EN ISO 1183-1:2004, Method A (Immersion), and a MFR$_{21.6}$ at a temperature of 190° C. under a load of 21.6 kg, determined according to DIN EN ISO 1133-1: 2012-03, of from 0.5 to 300 g/10 min.

16. A process for preparing an ethylene polymer comprising homopolymerizing ethylene or copolymerizing ethylene with one or more comonomers in the presence of a polymerization catalyst in multizone circulating reactor comprising a riser, in which growing polymer particles flow upwards under fast fluidization or transport conditions, and a downcomer, in which growing polymer particles flow downward in a densified form, and the riser and the downcomer are interconnected, and polymer particles leaving the riser enter the downcomer, and polymer particles leaving the downcomer enter the riser, for establishing a circulation of polymer particles through the riser and the downcomer, wherein the hold-up of polymer particles in the downcomer is from 55 wt. % to 80 wt. % of the total hold-up of polymer particles in the multizone circulating reactor, and a barrier fluid in liquid form is fed into the downcomer.

17. The process of claim 16, wherein the specific pressure reduction $\Delta p/h$ in the riser is in the range from 500 Pa/m to 3000 Pa/m, with h being the height of the riser and $\Delta p$ being the pressure difference between the bottom and the top of the riser.

18. The process of claim 16, wherein the reaction gas mixtures within the riser and the downcomer differ in their composition and the reaction gas mixtures within the downcomer has a lower ethylene content than the reaction gas mixtures within the riser.

19. The process of claim 16, wherein gaseous or liquid streams comprising ethylene and optionally one or more comonomers, inert components or hydrogen are fed to at least 3 monomer feeding points into the downcomer and the hold-up of polymer particles between two adjacent monomer feeding points is no greater than 35 wt. % of the total hold-up of polymer particles in the downcomer.

20. A process for preparing an ethylene polymer comprising homopolymerizing ethylene or copolymerizing ethylene with one or more comonomers in the presence of a polymerization catalyst in a reactor cascade comprising a fluidized bed reactor upstream of a multizone circulating reactor comprising a riser, in which growing polymer particles flow upwards under fast fluidization or transport conditions, and a downcomer, in which growing polymer particles flow downward in a densified form, and the riser and the downcomer are inter-connected, and polymer particles leaving the riser enter the downcomer, and polymer particles leaving the downcomer enter the riser, for establishing a circulation of polymer particles through the riser and the downcomer, wherein the hold-up of polymer particles in the downcomer of the multizone circulating reactor is from 55 wt. % to 80 wt. % of the total hold-up of polymer particles in the multizone circulating reactor.

* * * * *

UNITED STATES PATENT AND TRADEMARK OFFICE
CERTIFICATE OF CORRECTION

PATENT NO. : 10,968,291 B2
APPLICATION NO. : 16/348636
DATED : April 6, 2021
INVENTOR(S) : Meier et al.

Page 1 of 1

It is certified that error appears in the above-identified patent and that said Letters Patent is hereby corrected as shown below:

On the Title Page

Column 1, Item (30), Line 1, delete "16198262" and insert -- 16198262.4 --, therefor
Column 1, Item (30), Line 2, delete "17179386" and insert -- 17179386.2 --, therefor Signed and Sealed this
Twenty-fourth Day of January, 2023

Katherine Kelly Vidal
*Director of the United States Patent and Trademark Office*